United States Patent
Liebig

[11] 3,911,782
[45] Oct. 14, 1975

[54] DOUBLE SPREADING DOWEL

[76] Inventor: Heinrich Liebig, Crumstaedter Str. 23, 6102 Pfungstadt, Germany

[22] Filed: Oct. 1, 1973

[21] Appl. No.: 402,055

[30] Foreign Application Priority Data
Oct. 11, 1972 Germany............................ 2249762

[52] U.S. Cl........................................ 85/67; 85/72
[51] Int. Cl.$^2$........................................ F16B 13/06
[58] Field of Search............. 85/67, 69, 73, 74, 75, 85/76, 79, 71, 70, 72

[56] References Cited
UNITED STATES PATENTS

| 945,403 | 1/1910 | Mohun................................... 85/67 |
| 1,276,708 | 8/1918 | Bair....................................... 85/75 |
| 1,305,001 | 5/1919 | Ogden................................... 85/67 |
| 2,610,013 | 9/1952 | Gibson................................... 85/71 |
| 3,091,990 | 6/1963 | McVittie................................ 85/67 |
| 3,735,665 | 5/1973 | Mortensen............................. 85/71 |

FOREIGN PATENTS OR APPLICATIONS

| 1,008,782 | 11/1965 | United Kingdom..................... 85/67 |
| 1,005,474 | 4/1957 | Germany................................. 85/75 |
| 84,373 | 10/1954 | Norway................................... 85/75 |
| 107,707 | 6/1943 | Sweden................................... 85/67 |
| 347,632 | 8/1960 | Switzerland............................. 85/79 |
| 280,322 | 1/1965 | Australia................................. 85/67 |
| 227,800 | 2/1969 | U.S.S.R................................... 85/79 |

Primary Examiner—Marion Parsons, Jr.
Attorney, Agent, or Firm—Hill, Gross, Simpson, Van Santen, Steadman, Chiara & Simpson

[57] ABSTRACT

An expanding dowel anchoring device to be received in and expanded in a bore of a base member consisting of a multi-piece tube with circumferentially extending breakable connecting bars connecting the pieces of the tube together, the tube having a bolt extending therethrough with spreading members at each end of the tube movable towards one another to expand the tube. One of the spreading members is loosely received around the bolt and a support disc having a deformable shape is positioned between the loose spreading member and the bolt head with an outer periphery portion contacting an object to be attached by the anchoring device to the base.

4 Claims, 1 Drawing Figure

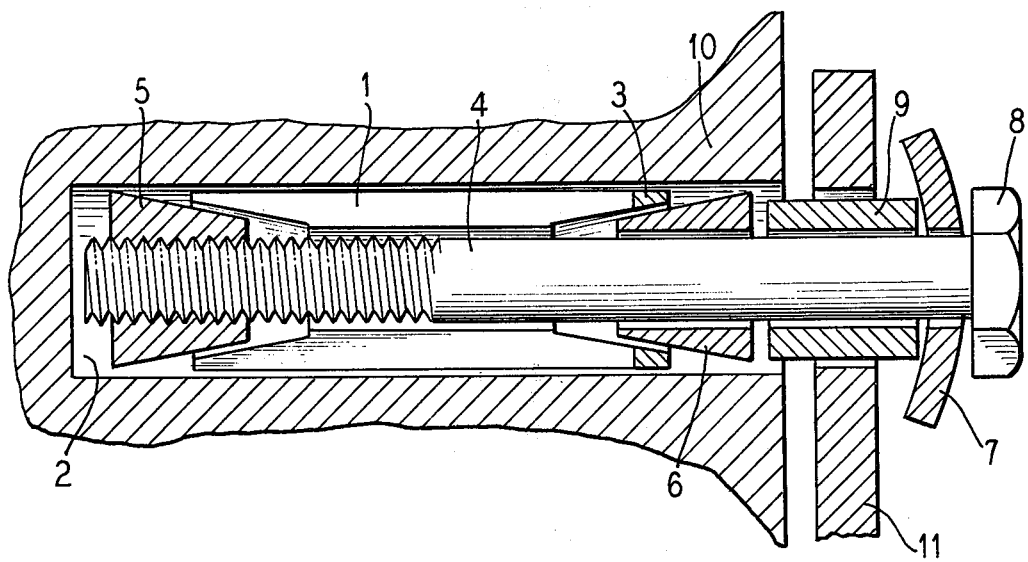

DOUBLE SPREADING DOWEL

BACKGROUND OF THE INVENTION

1. Field of the Invention

This invention relates to anchoring devices and more particularly to expandable dowel anchoring devices.

2. Prior Art

This invention incorporates an anchoring device having a spreadable dowel which is sized for insertion into a bore hole in a base member. The dowel has a tube portion consisting of individual segments. Two spreading members are arranged at the ends of the tube portion and are received around a threaded bolt. The spreading members may be moved towards each other during rotation of the bolt to expand the tube radially.

A supporting disc may be positioned under the head of the bolt exterior to the bore which serves to press the object to be attached to the base member between the supporting disc and the base member. Double spreading expandable anchors of this type are known where the segments are connected at the mouth end of the tube with each other by means of bars which can be broken. Anchors of this type are advantageous especially since the individual segments are connected by the bars into a tube shaped member with sufficient rigidity to prevent the segments from separating during normal storage and shipment as well as during normal installation into the bore.

After insertion of the tube portion and the spreading members into the bore in the base member, if the threaded bolt is turned, the spreading member located furthest into the bore and remote from the head of the bolt will be pulled into the bore and remote from the head of the bolt will be pulled into the tube portion thereby expanding the sections of the tube portion. After this expansion has caused the outer diameter of the tube portion adjacent the furthest end of the tube to expand to contact the bore wall, further tightening of the bolt will cause a resistance to further movement of the furthest spreading member. This will cause the spreading member located at the mouth end of the bore to be pulled into the tube. This will cause an expansion of the mouth end of the tube thereby breaking the connecting bars. After the spreading takes place at both ends, the tube will have a substantially cylindrical shape as initially but with a somewhat larger diameter due to the parallel spreading. In this manner the segments of the tube will press along their entire length against the inner wall surface of the bore.

The above described prior art anchoring devices are subject to failure in those instances where the to be attached object lies fully on the base member prior to the time of breaking of the bars at the mouth end of the tube. While it is generally desirable that the to be attached member abut against the base member, where full abutment occurs too soon it will not be possible to further move the spreading device at the mouth end of the tube to assure that the mouth end of the tube is fully spread and the bars are broken.

SUMMARY

This invention overcomes the disadvantages of the prior art and eliminates the above mentioned occasional problem where the mouth end of the tube is not fully spread and the bars are not fully broken. Further, this invention allows the use of stronger designed bars and higher strength materials than in previous constructions.

The expanding dowel anchoring device according to this invention adds to the prior art devices a supporting disc which is non-planar. The disc is interposed between the head of the bolt and the object to be attached in such a way that the disc has at first an inner diameter distance from the full attached position which is reduced during tightening. That is, the central part of the pressure disc which is designed for exerting pressure onto the spreading member at the mouth end of the tube is spaced from the mouth end greater than the outer periphery of the supporting disc initially and that during tightening of the bolt this distance difference diminishes by deformation of the supporting disc.

The effect of the supporting disc in allowing full spreading of the spreading member is based on the yielding nature of the support disc. By allowing the support disc to act against the spreading member at the mouth end of the tube, the strong axial force derived by rotation of the bolt will guarantee that the spreading member is forced into the tube to expand the mouth end thereof. It is not considered important whether the supporting disc is primarily an elastic material, for example, steel or a permanently deformable material since the important criteria is the transfer of the axial force to the spreading member. In view of this, it is not necessary for the support disc to contact the spreading member directly which would require that the spreading member project somewhat from the base plane or whether the supporting disc acts against a spacer received between the spreading member at the mouth of the tube and the supporting disc thereby allowing the entirety of the spreading member to be received within the bore. The important criterion is that after the remote end of the segmented tube member has been spread into contact with the bore wall adjacent the bottom of the bore that the supporting disc acts against the front or mouth end spreading member to cause the same to break the bars by movement of the front end spreading member into the tube.

It is therefore an object of this invention to provide an improved expanding anchoring device.

It is another object of this invention to provide an expanding dowel anchoring device including a segmented tube which is expanded by spreading members at either ends thereof with a bolt received therethrough and with a supporting disc positioned between the exterior end of the bolt and an object to be attached by the device.

It is a particular object of this invention to provide an expanding dowel anchoring device consisting of a bolt having a threaded portion extending through a segmented tube dowel the segments of which are held together by circumferentially extending bars, the segments being spread apart by spreading devices located at either end of the tube and a deformable supporting disc positioned between an object to be attached to a base by the bolt and the bolt head.

BRIEF DESCRIPTION OF THE DRAWING

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure and in which:

The FIGURE is a cross sectional view of a preferred embodiment of the anchoring device of this invention as received in a bore.

DESCRIPTION OF THE PREFERRED EMBODIMENT

The FIGURE illustrates a preferred embodiment of this invention in which the supporting disc has the shape of a conical washer or gear shift cap and with a spacer member received between the supporting disc and the mouth end spreading member. It is to be understood that the particular design of the supporting disc is exemplary only and the use of the spacer is not necessary with other designs of the supporting disc.

In the illustrated embodiment the tube 1 of the expanding dowel anchoring device which is to be inserted into a bore 2 is subdivided in the usual way into four sections. It will of course be understood that this is a preferred embodiment only and that a subdivision into a greater or lesser number of sections is possible. For example, a subdivision into three sections may at times offer particular advantages.

The subdivision into section is carried out by means of longitudinal slots which do not extend the entire length of the tube. Connecting bars 3 having a comparatively small cross section extend circumferentially from one section to an adjacent section to form a connection between each adjacent section. The four sections 1 are thus firmly connected with each other at the mouth end of the tube which is illustrated on the right in the drawing. This connection of sections by means of the bars 3 is made strong enough so that the tube member formed by the sections will constitute a fairly rigid unit in spite of the subdividing longitudinal slots. This means that the sections will not spread by themselves at the free or bottom end of the tube located at the left in the drawing. Further, it is preferable if the bars be sufficiently strong so that the sections will not spread under the influence of a slight axial force. Most importantly however, the bars 3 should be strong enough so that the danger that the segments may fall apart due to unintentional breaking of one or more bars is eliminated.

A threaded bolt 4 is inserted through the hollow center of the tube fromed by the segments. The threaded bolt carries two substantially frustrum shaped spreading members 5 and 6. The spreading member 5 is provided with an inner diameter thread and is screwed onto the bolt 4. The spreading member 6 is not so secured but is received around the bolt loosely with clearance. A supporting disc 7 is also received around the bolt loosely between the spreading member 6 and the bolt head. The illustrated embodiment shows a threaded bolt with a firm head. Other embodiments may utilize bolts which are threaded at the mouth end and which carry screwed on nuts.

Between the loosely slipped on spreading member 6 located at the mouth of the bore and the supporting disc 7 a spacer tube 9 is arranged. The object which is to be attached 11 to the base 10, for instance a wall or a bottom surface, is loosely received around the spacer tube. An opening in the object 11 has a diameter which is slightly larger than the diameter of the spacer tube 9 so that the latter fits into the bore with a certain clearance. On the other hand, the diameter of the opening in the object 11 is smaller than the outer diameter of the supporting disc so that the supporting disc contacts the object 11 around the disc edge or outer periphery. When the threaded bolt is turned by means of a wrench or the like so that as it pulls the spreading member 5 into the bottom end of the tube 1, the tube will start expanding at the bottom end of the bore 2 in the base 10 until the ends of the segments are pressed with increasing pressure against the inner wall surface of the bore.

Consequently the force with which the bolt head 8 presses against the arched supporting disc 7 will increase. Thus the supporting disc 7 will gradually flatten and will approach the shape of a flat ring disc. Therefore the force which is exerted by the bolt head 8 against the disc 7 and also the force exerted via the spacer tube 9 against the spreading member 6 will increase continuously so that the bars 3 will be definitely broken. Generally this takes place before the arched supporting disc 7 has reached the shape of the flat ring disc.

It is obvious from the above that the breaking of the connecting bars is guaranteed. The spreading member 5 located at the bottom end of the bore 2 will not be pulled into the jacket 1 without causing a breaking of the bars 3. In this manner a perfect cylindrical expansion of the tube 1 is achieved which is a decisive advantage of this invention over the formerly used conical expanding dowel.

As indicated above, the shape of the supporting disc used in the illustrated embodiment constitutes only a preferred embodiment which presents an advantageous solution. The same may also be achieved with other shapes. It is only important the supporting disc contacts with its outer margin the object to be attached while there remains a space in the central area of the supporting disc. This assures that the disc area which acts against the spreading member at the mouth of the tube will cause the spreading member to enter the tube to thereby expand the mouth end before the bolt head bottoms against the object to be attached.

Other shapes for the disc could be utilized. For instance, corrugated discs may be used in place of the concave disc. Further, porjections in the form of prongs could be pressed out of the outer diameter zone of the disc as it faces the object to be attached. There is also the possibility of using special ring discs in between the object to be attached and the supporting disc which would cause a contact around the entire outer diameter area of the supporting disc and which would thus keep the central area free to allow the above discussed pressing forward of the central part to occur.

Examples of other supporting discs or the like which will allow continual axial movement of the bolt head and therefore of the mouth end spreading member after the disc has pressed the object to be attached against the base member 10 are ring discs whose ring surface only occupies the outer area of the supporting disc and which thereby serve as bearing discs while simultaneously keeping the central area free, variously shaped plastic parts, corrugated hat-like supporting discs or supporting discs which are deformed by peaks and which can be further deformed by the influence of the axial force, or the like constructions. All such constructions will assure that the breaking of the mouth end tube connecting bars will occur.

The pressure which is required for the movement of the bolt head or of the bolt end nut respectively, can be predetermined by the selection of the material of the tube and bars and by the shape of the supporting disc.

It can be determined in advance at which stage of the expansion of the bottom end of the tube the bars at the mouth end should be broken in order to cause the desired cylindrical expansion of the tube.

It can therefore be seen that essential advantages are created by means of this invention. On the one hand the desired breaking points can be designed stronger than in the past. Further, the breaking point of the bars can be determined in advance in such a way that the most favorable expansion of the tube is guaranteed to create a cylindrical expansion. It is further assured that the front or mouth spreading member will penetrate far enough into the tube. Thus the tube will expand over its entire outer surface and will have this surface pressed against the wall of the bore consistently. This advantageous characteristic of the expanding dowel anchoring device of this invention further allows the use of materials of higher strength and stability than in the past.

Although the teachings of my invention have herein been discussed with reference to specific theories and embodiments, it is to be understood that these are by way of illustration only and that others may wish to utilize my invention in different designs or applications.

I claim as my invention:

1. An expanding dowel anchor to be inserted into a bore in a base member for attaching an object to the base member comprising: a tube member consisting of a plurality of individual segments, the segments connected together at an outer end of the tube by breakable bars, inner and outer spreading members arranged respectively at opposite inner and outer ends of the tube, a threaded bolt extending through the spreading members and tube in threaded connection with the inner spreading member and freely received through the outer spreading member, the spreading members capable of being pulled towards each other as a result of rotation of the threaded bolt, axial movement of the spreading members towards one another radially expanding the tube segments, a supporting disc positioned around the bolt intermediate a head end of the bolt exterior of the tube and the outer spreading member positioned at the outer end of the tube, the supporting disc member having an outer peripheral portion which projects in the direction of the tube to a greater extent than a central portion of the supporting disc, the central portion of the supporting disc operatively abutting the outer spreading member, the supporting disc being deformable under axial force applied thereagainst by the head of the bolt, the axial force being transmitted through the central portion of the supporting disc to the outer spreading member to expand the outer end of the tube by movement of the outer spreading member after the object to be attached to the base has been entrapped between the outer peripheral portions of the supporting disc and the base, the supporting disc having a configuration in the direction of the tube whereby the outer periphery will contact the object to be attached to the base before the central section becomes level with the object to be attached, the object to be attached having an aperture therethrough with a diameter greater than the central portion of the supporting disc but less than the outer periphery of the disc with the bolt projecting through the aperture, the disc being deformed and the central portion of the disc transmitting an axial force from the bolt head to the outer spreading member after axial movement of the tube member has been stopped by expansion of the inner end within the bore, a spacer tube positioned between the central portion of the supporting disc and the outer spreading member, the operative abutting of the disc and the outer spreading member being through the spacer tube, the spacer tube freely passing through the aperture in the object to be fastened, and the spacer tube having a length greater than the thickness of the object to be fastened.

2. The device of claim 1 wherein the supporting disc is a concave washer which is deformed to a substantially flat state.

3. The device of claim 1 wherein the spacer tube is a hollow cylinder loosely received around the bolt.

4. The device of claim 3 wherein the outer spreading member is positioned at the end of the tube which includes the connecting bars.

* * * * *